United States Patent
Gröppel et al.

(10) Patent No.: US 9,589,699 B2
(45) Date of Patent: Mar. 7, 2017

(54) INSULATION SYSTEMS HAVING IMPROVED PARTIAL DISCHARGE RESISTANCE, AND METHOD FOR PRODUCING SAME

(75) Inventors: Peter Gröppel, Erlangen (DE); Dieter Heinl, Weisendorf (DE); Christian Meichsner, Buttenheim (DE); Igor Ritberg, Fürth (DE)

(73) Assignee: SIEMENS AKTIENGESELLSCHAFT (DE)

( * ) Notice: Subject to any disclaimer, the term of this patent is extended or adjusted under 35 U.S.C. 154(b) by 353 days.

(21) Appl. No.: 14/345,692

(22) PCT Filed: Sep. 3, 2012

(86) PCT No.: PCT/EP2012/067141
§ 371 (c)(1),
(2), (4) Date: May 21, 2014

(87) PCT Pub. No.: WO2013/041363
PCT Pub. Date: Mar. 28, 2013

(65) Prior Publication Data
US 2014/0326481 A1    Nov. 6, 2014

(30) Foreign Application Priority Data

Sep. 22, 2011 (DE) .................. 10 2011 083 228

(51) Int. Cl.
*H01B 3/40* (2006.01)
*H01B 3/04* (2006.01)
(Continued)

(52) U.S. Cl.
CPC ................ *H01B 3/04* (2013.01); *B82Y 30/00* (2013.01); *H01B 3/002* (2013.01); *H01B 3/40* (2013.01); *H01B 19/02* (2013.01); *H01B 19/04* (2013.01)

(58) Field of Classification Search
CPC ............... H01B 3/40; C08K 3/36; C08K 9/06
See application file for complete search history.

(56) References Cited

U.S. PATENT DOCUMENTS 4,269,894 A * 5/1981 Sakai .................. H01B 3/46
                                                          156/329
6,147,319 A    11/2000 Imai et al.
(Continued)

FOREIGN PATENT DOCUMENTS

CN       1305632 C    3/2007
CN     101189686 A    5/2008
(Continued)

OTHER PUBLICATIONS

Huntsman Datasheet 2003.*
(Continued)

*Primary Examiner* — Mark Kaucher
(74) *Attorney, Agent, or Firm* — Ostrolenk Faber LLP

(57) ABSTRACT

Disclosed are insulating electric conductors against partial discharge and a method for producing an insulation system having improved partial discharge resistance and such an insulation system. There is an erosion-inhibiting effect of adhesion promoters, such as organic silicon compounds, added to resin when admixing nano particulate fillers. Good results may be attributable to a type of particle wetting of the nano particles as a result of particle wetting with organosilanes. The admixture of adhesion promoters with the resin before the addition of the nano particulate filler provides considerable advantages.

11 Claims, 2 Drawing Sheets

(51) Int. Cl.
*B82Y 30/00* (2011.01)
*H01B 19/04* (2006.01)
*H01B 3/00* (2006.01)
*H01B 19/02* (2006.01)

(56) References Cited

U.S. PATENT DOCUMENTS

| | | | | |
|---|---|---|---|---|
| 2001/0008877 A1* | 7/2001 | Hartmann | | B41N 3/006 |
| | | | | 510/171 |
| 2013/0131218 A1 | 5/2013 | Gröppel et al. | | |
| 2013/0203897 A1 | 8/2013 | Kornmann et al. | | |
| 2015/0101845 A1* | 4/2015 | Groppel | | B82Y 30/00 |
| | | | | 174/120 C |

FOREIGN PATENT DOCUMENTS

| | | |
|---|---|---|
| CN | 102725802 A | 10/2012 |
| CN | 103003345 A | 3/2013 |
| DE | 10 2010 019 724 A1 | 11/2011 |
| WO | WO 2006/118536 A1 | 11/2006 |
| WO | WO 2008/129032 A1 | 10/2008 |
| WO | WO 2011/095208 A1 | 8/2011 |
| WO | WO 2012/013439 A1 | 2/2012 |

OTHER PUBLICATIONS

First Office Action dated Jun. 26, 2015 in corresponding Chinese Patent Application No. 201280045367.4 and Search Report with English language translation (30 pages).
Aerosil 200—Technisches Datenblatt, HACOTECH GmbH, 2009.
German Search Report dated Jul. 24, 2012 issued in corresponding German patent application No. 10 2011 083 228.9.
International Search Report dated Jan. 23, 2013 issued in corresponding International patent application No. PCT/EP2012/067141.
Written Opinion dated Jan. 23, 2013 issued in corresponding International patent application No. PCT/EP2012/067141.

* cited by examiner

INSULATION SYSTEMS HAVING IMPROVED PARTIAL DISCHARGE RESISTANCE, AND METHOD FOR PRODUCING SAME

CROSS-REFERENCE TO RELATED APPLICATIONS

The present application is a 35 U.S.C. §§371 national phase conversion of PCT/EP2012/067141, filed Sep. 3, 2012, which claims priority of German Patent Application No. 102011083228.9, filed Sep. 22, 2011, the contents of which are incorporated by reference herein. The PCT International Application was published in the German language.

Technical Field

Insulation systems having improved partial discharge resistance, and method for producing same.

The present invention pertains generally to the field of the insulation of electrical conductors against partial discharge, and specifically to a method for producing an insulating system having improved partial discharge resistance and to an insulating system having improved partial discharge resistance.

BACKGROUND OF THE INVENTION

In rotating electrical machines, such as motors or generators, the reliability of the insulating system is critically responsible for their operational integrity. The insulating system has the function of electrically insulating electrical conductors (wires, coils, bars) durably from one another and from the laminated stator core or the environment. Within high-voltage insulation, distinctions are made in insulation between partial conductors (partial conductor insulation), between the conductors or windings (conductor or winding insulation), and between conductor and ground potential in the slot and winding head region (main insulation). The thickness of the main insulation is adapted both to the nominal voltage of the machine and to the operational and fabrication conditions. The competitiveness of future plants for energy production, their distribution and utilization, is critically dependent on the materials employed and technologies applied for the insulation.

The fundamental problem with insulators loaded electrically in this way lies in the so-called partial discharge-induced erosion with formation of what are called "treeing" channels, which lead ultimately to the electrical breakdown of the insulator.

High-voltage and medium-voltage machines currently employ what are called impregnated laminar mica insulation systems. In these systems, the form-wound coils and conductors produced from the insulated partial conductors are enwound with mica tapes and impregnated with synthetic resin preferably in a vacuum pressure impregnation (VPI) process. The combination of impregnating resin and the carrier tape of the mica provides the present mechanical strength and also the required partial discharge resistance of the electrical insulation.

Mica paper is converted, in line with the requirements of the electrical industry, into a more stable mica tape. This is done by bonding the mica paper to a carrier material having a high mechanical strength, by means of an adhesive. A feature of the adhesive is preferably that it has a high strength at room temperature, in order to ensure the joint between mica and carrier, and passes into a liquid state at elevated temperatures (60° C.-150° C.). This allows it to be applied as an adhesive at elevated temperature in liquid form or in a mixture with a volatile solvent. After cooling has taken place or the solvent has been removed, the adhesive is present in a solid yet flexible form, and allows the mica tape to be applied, for example, around Roebel bars consisting of partial conductors and form-wound coils at room temperature, with the adhesive properties of the adhesive preventing delaminations of the mica paper from the carrier material. The resulting mica tape is wound in a plurality of plies around electrical conductors.

High-voltage and medium-voltage motors and generators employ laminar mica insulation systems. In these systems, the form-wound coils produced from the insulated partial conductors are enwound with mica tapes and impregnated with synthetic resin primarily in a vacuum pressure impregnation (VPI) process. In this case, mica is used in the form of mica paper, and as part of the impregnation the cavities located between the individual particles in the mica paper are filled with resin. The combination of impregnating resin and carrier material of the mica provides the mechanical strength of the insulation. The electrical strength comes about from the multiplicity of solid-solid interfaces in the mica used. The resulting layering of organic and inorganic materials forms microscopic interfaces whose resistance to partial discharge and thermal stresses is determined by the properties of the mica platelets. As a result of the complicated VPI process, even very small cavities in the insulation must be fully filled with resin, in order to minimize the number of internal gas-solid interfaces.

For the additional improvement of the resistance, the use of nanoparticulate fillers is described.

The combination of impregnating resin and the carrier tape of the mica provides the present mechanical strength and also the required partial discharge resistance of the electrical insulation.

As well as the VPI process, there is also the Resin Rich technology for producing and impregnating the mica tape, in other words the insulating tape and then, subsequently, the insulating system.

The main difference between these two technologies is the construction and manufacture of the actual insulating system of the coils. Whereas the VPI system is complete only after the impregnation and after the curing of the winding in a forced air oven, the leg of the Resin Rich coil, cured separately under temperature and pressure, constitutes a functioning and testable insulating system even before installation into the stator.

The VPI process operates with porous tapes, forming a solid and continuous insulating system under vacuum with subsequent exposure of the impregnating vessel to overpressure after curing in the forced air oven.

In contrast to this, the manufacture of Resin Rich coils is more complex, since each coil leg or winding bar has to be manufactured individually in specific baking presses, leading to a specific increase in the costs of the individual coil.

In this context, mica tapes are employed that are impregnated with a polymeric insulating substance which is present at what is called a B-stage. This means that the polymer, usually aromatic epoxy resins (BADGE, BFDGE, epoxidized phenol novolaks, epoxidized cresol novolaks, and anhydrides or amines as hardeners), is partially crosslinked and is thus in a tack-free state, but on further heating is able to melt again and be ultimately cured, so as to be brought into the final shape. Since the resin is introduced in an excess, it is able, during the final pressing operation, to flow into all cavities and voids, in order to attain the corresponding quality of insulation. Excess resin is pressed out of the system by the pressing operation.

From the literature it is known that the use of nanoparticulate fillers in polymeric insulating substances leads to significant improvements in the insulation in respect of the electrical longevity.

A disadvantage of the known systems, especially of those based on epoxy resins, is the rapid degradation of the polymeric matrix on exposure to partial discharge, here referred to as erosion. Implementing the polymer matrix with erosion-resistant nanoparticles (aluminum oxide, silicon dioxide) causes its exposure, brought about by incipient breakdown of the polymer, referred to as polymer degradation.

SUMMARY OF THE INVENTION

It is the object of the present invention to enable an insulating system having improved partial discharge resistance.

Presented in accordance with one aspect of the invention is a method for producing an insulating system having improved partial discharge resistance, comprising the following method steps:
 providing an insulating tape which comprises a mica paper and a carrier material, which are bonded to one another by means of an adhesive,
 enwinding an electrical conductor with the insulating tape, and
 impregnating the insulating tape wound around the conductor with synthetic resin, wherein an adhesion promoter is added to the synthetic resin system before the nanoparticulate filler is added.

According to a further aspect of the invention, an insulating system having improved partial discharge resistance is presented, having an insulating tape which is wound around an electrical conductor and comprises a mica tape joined to a carrier material, the insulating tape being impregnated with a synthetic resin, wherein the impregnated insulating tape is interspersed with a nanoparticulate filler which is agglomerated at least partly via an adhesion promoter.

It is known that in contrast to polymeric insulating substances, inorganic particles are not destroyed or damaged, or only to a very limited extent, on exposure to partial discharge. The resultant erosion inhibition effect of the inorganic particles here is dependent on factors including the particle diameter and the particle surface which generates from it. It is found here that the greater the specific surface area of the particles, the greater the erosion inhibition effect on the particles. Inorganic nanoparticles have very high specific surface areas, at 50 g/m2 or more.

Generally speaking, an unfilled or mica-based insulating substance based on epoxy resins exhibits rapid degradation of the polymeric matrix on exposure to partial discharge. Implementing the polymer matrix with erosion-resistant, nanoparticulate filler (aluminum oxide, silicon dioxide) results in exposure of the nanoparticulate filler, caused by polymer degradation.

As the duration of erosion increases, a firmly adhering, sheetlike layer is gradually formed on the surface of the test element, consisting of exposed nanoparticulate filler. As a result of this particle crosslinking of the nanoparticulate filler, caused by the eroded polymer, the surface is passivated and the polymer beneath the passivation coat is effectively protected from further erosion under partial discharge exposure.

Surprisingly it has been found that through the use of adhesion promoters, more particularly of silanes, in the impregnating resin and/or in the Resin Rich resin, it has been possible to inhibit erosion.

Adhesion promoters are usually organosilicon compounds which through condensation reactions are attached chemically to the surface of fillers or nanoparticles. The adhesion promoter gives rise to improved attachment of the particles to the polymer matrix, thereby producing an improved erosion resistance. This is directly dependent on the surface area of the filler, which is why the use of adhesion promoters on particles with small diameters improves the erosion resistance to a particular degree. A coating of this kind corresponds to the first layer in the Multi Core model of Prof. Tanaka in Tanaka et al., Dependence of PD Erosion Depth on the Size of Silica Fillers; Takahiro Imai*, Fumio Sawa, Tamon Ozaki, Toshio Shimizu, Ryouichi Kido, Masahiro Kozako and Toshikatsu Tanaka; Evaluation of Insulation Properties of Epoxy Resin with Nano-scale Silica Particles, Toshiba Research Cooperation.

It has been shown that the use of organosilanes can be utilized synergistically with nanoparticles by admixing adhesion promoters such as silanes to the impregnating resin or Resin Rich resin.

One particularly advantageous embodiment of the invention lies in the synergistic utilization of the described model of the passivation coat under PD loading, and the improvement in erosion inhibition through the use of organosilanes in mica-based high-voltage insulating systems. This is achieved by the added organosilanes exerting a positive influence on the formation and mode of action of the passivation coat that forms under PD loading. The enhanced erosion resistance can be explained by spontaneous sintering of the particles, catalyzed by the use of organosilanes, and the formation of a quasiceramic layer. The use of organosilanes here is not confined to their use for the coating of nanoparticles, but may also take place, as described for the first time here, by their direct addition as a component to the reactive resin formulation.

Elucidated below are possible fundamental principles for advantageously improved erosion resistance through the use of organic silanes in the resin formulation:

Organic silanes are activated under PD loading and lead, by means of condensation reactions, for example, to crosslinking of the nanoparticles via siloxane bonds which form.

POSS (polyhedral oligomeric silsesquioxanes) constitute the smallest possible unit of nanoparticulate organic silanes and allow the crosslinking of nanoparticles under the influence of PD energies.

Organic silanes (mono- or polyfunctional), with their reactive groups, allow the crosslinking of nanoparticles through chemical reactions with reactive groups on the nanoparticle surface.

In accordance with the invention, particularly advantageous embodiments result with reactive resin formulations constructed from the following components:

The resin basis is formed, for example, by an epoxy resin and/or a polyurethane resin.

The hardener comprises an anhydride, an aromatic amine and/or an aliphatic amine, for example, as functional group.

The nanoparticulate filler has a particle size of, for example, between 2.5 to 70 nm, more particularly from 5 to 50 nm in a concentration of between 5 and 70 wt %, more particularly between 10-50 wt % on the basis of $SiO_2$ or $Al_2O_3$. Further fillers, additives, and pigments may be present.

The adhesion promoter is preferably an organic silicon compound, such as an organosilane and/or POSS. They are present in the synthetic resin—again preferably—at a concentration of between 0.1 and 45 wt %, more particularly of 1-25 wt %.

The use of adhesion promoters such as organic silicon compounds as part of the resin formulation in combination with the stated components offers the following advantage—that the use of adhesion promoter, namely silane as part of the reactive resin is possible in higher concentrations than when using silanes as adhesion promoters of the particles before the addition to the reactive resin. Through the use of the organosilane as part of the resin formulation it is possible, moreover, to use a substantially greater number of silanes, since the spectrum of organic silanes that can be used is increased if they do not have to be anchored in the form of coatings to the surfaces of the particles.

As a result of the advantages elucidated, the spectrum of organosilanes that can be used is very wide. Typically, silanes are used which contain one or more functional groups having sufficient reactivity to be able to undergo reaction with the particle surface. The silanes used may have 1 to 4 functional groups.

Description of Embodiments

Figure 1:
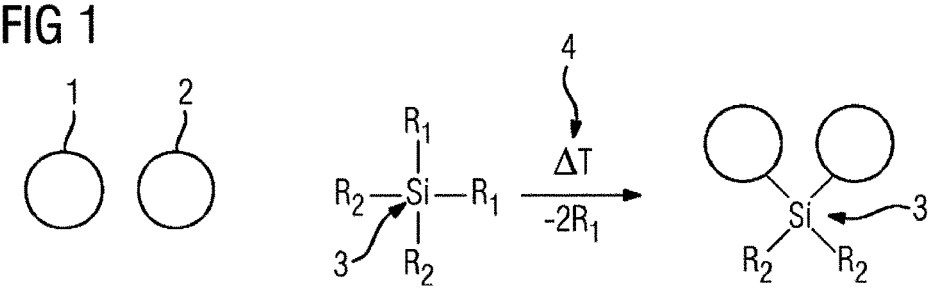
FIG. 1 shows schematically a general mechanism for in situ particle crosslinking.

FIG. 1 shows schematically a general mechanism for in situ particle crosslinking, using a difunctional organosilane as an example. Fundamentally, silanes may possess one to four reactive functional groups, in order to exert a positive effect on the erosion resistance. These functional groups have the property of being able to react with the particle surface, resulting in the large spectrum of organosilanes.

The mechanism of particle crosslinking proposed in FIG. 1 with a difunctional silane; $R_1$=hydroxyl, alkoxy, halogen, glycidyloxy; $R_2$=alkyl, glycidyloxy, vinyl, propylsuccinic anhydride, methacryloyloxypropyl shows the substitution of the radicals $R_1$ on the silane by nanoparticles. $R_2$ also be amidic, sulfidic, oxidic, or H. "Amidic, oxidic, and sulfidic" here means that further organic $R'_2$ may be present, bonded to the silicon via nitrogen, oxygen, or sulfur.

The particles 1 and 2 are both bonded to the silicon core 3 by substitution of the radicals $R_1$ on said core 3, with an increase in temperature, for example, and are therefore located in the immediate vicinity of one another, and are crosslinked via the silicon core 3.

The potential of nanotechnology is evident here again when using nanoparticulate fillers in combination with the silanes of the invention, as for example in the presently employed insulating materials based on mica.

Figure 2:
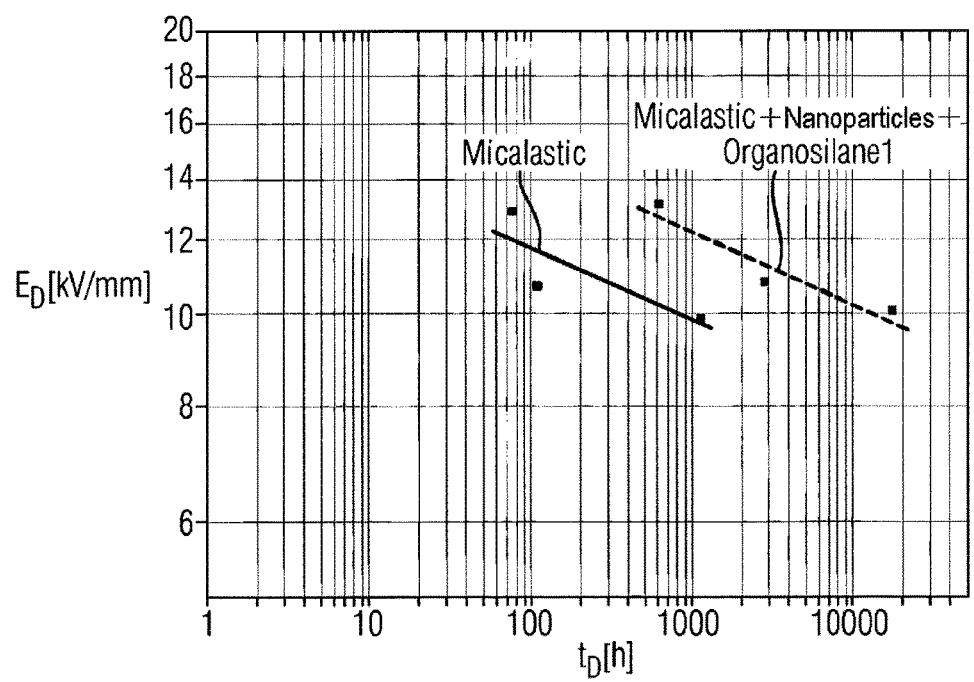
FIG. 2 shows a graph representing the average values for the electrical lifetime of batches of seven test specimens.
Figure 3:
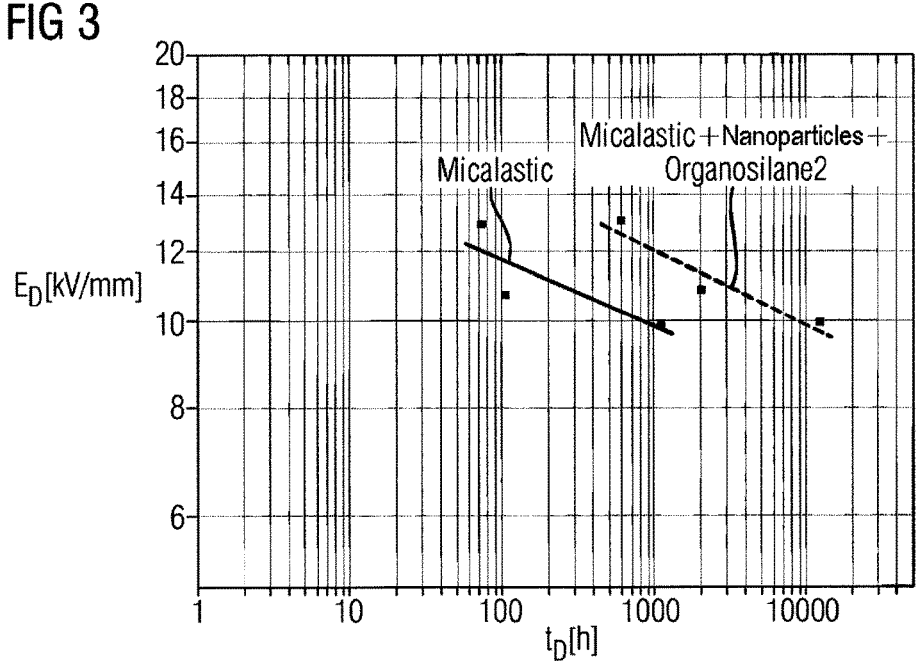
FIG. 3 shows lifetime curves for unfilled and nanoparticulate-filled high-voltage insulating systems.
Figure 4:
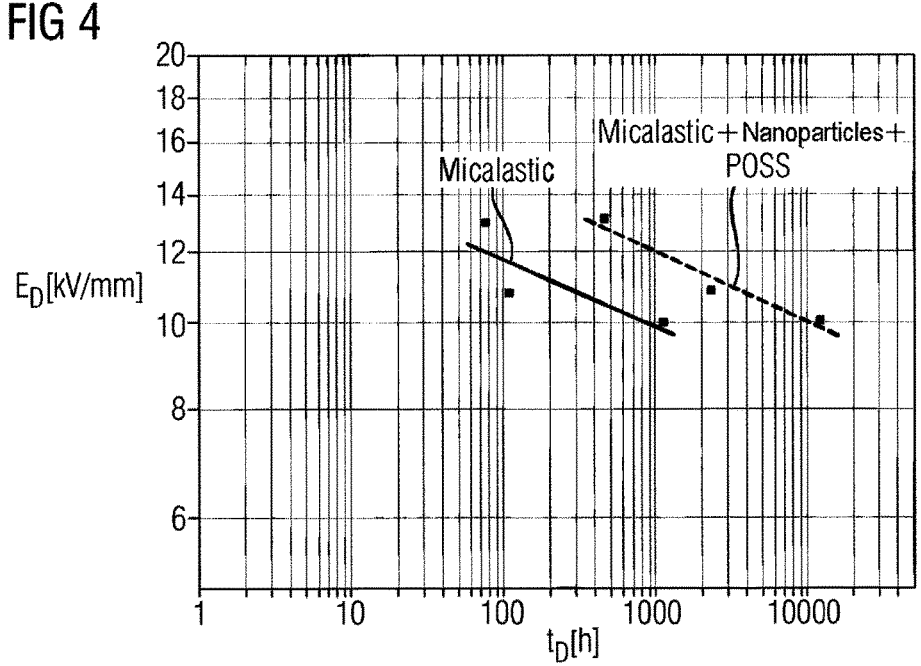
FIG. 4 shows lifetime curves for unfilled and nanoparticulate-filled high-voltage insulating systems.

In FIGS. 2 to 4, reference samples which are experimental specimens (represented by interrupted lines) are contrasted in each case with embodiments of the invention. The experimental specimens correspond in reduced-size form to the state of the art in respect of insulated Cu conductors in stators of hydroelectric generators or turbogenerators. They are measured under electrical field loading to the point of electrical breakdown. Since the electrical strength of the insulating system under operational exposure runs to several decades, the electrical durability tests take place with multiply overdimensioned electrical field strengths.

The graph shown in FIG. 2 represents the average values for the electrical lifetime of batches of seven test specimens under three different field exposures for both a standard insulating system (mica) and a nanoparticulate/silane filled insulating system. The unfilled systems (designated Micalastic) have a fraction of about 50 wt % mica and 50 wt % resin. The stated fraction of nanoparticles reduces the fraction of resin correspondingly. The fraction of mica remains constant in each case.

The lifetime curves shown in FIG. 2 for unfilled and nanoparticulate-filled high-voltage insulating systems (Micalastic (black) and, Micalastic with nanoparticles 10 wt % (diameter about 20 nm) and organic silane (3-glycidyloxypropyltrimethoxysilane, 5 wt %) show clearly that the latter systems exhibit a significantly extended lifetime under given loading.

FIG. 3 shows corresponding lifetime curves for unfilled and nanoparticulate-filled high-voltage insulating systems (Micalastic (black) and, Micalastic with nanoparticles 10 wt % (diameter about 20 nm), octamethyltrisiloxane 2.5 wt %. Here again, the virtually parallel shift in lifetimes toward longer times is readily apparent.

FIG. 4, finally, shows the lifetime curves for unfilled and nanoparticulate-filled high-voltage insulating systems (Micalastic (black) and, Micalastic with nanoparticles 10 wt % (diameter about 20 nm), POSS (2.5 wt %).

Comparing the lifetime of each of the groups, it is found that improvements in the lifetime in the factor of 20 to 30 are achieved. Both lifetime profiles have the same slope, and so it appears possible to transpose the prolonged lifetime directly to operational conditions.

Insulating systems with a nanoparticulate fraction of up to 35 wt % are possible.

The invention shows for the first time the surprising erosion-inhibiting effect of adhesion promoters such as organic silicon compounds, present in the resin, when nanoparticulate filler is added. The introduction of the adhesion promoter into the resin before the nanoparticulate filler results in surprisingly good outcomes. There is discussion as to whether the good results as illustrated in FIGS. 2 to 4 are attributable to a kind of particle crosslinking of the nanoparticles by particle crosslinking with the organosilanes. At any rate it is possible to show impressively that the admixing of adhesion promoters to the resin prior to the addition of the nanoparticulate filler is able to bring considerable advantages.

The invention claimed is:

1. A method for producing an insulating system comprising the steps of:
   providing an insulating tape which comprises a mica paper and a carrier material, which are bonded to one another by means of an adhesive,
   enwinding an electrical conductor with the insulating tape,
   producing synthetic resin by introducing a resin system with an adhesion promoter, into which a nanoparticulate filler is incorporated, and
   impregnating the insulating tape wound around the conductor with the synthetic resin,
   wherein the nanoparticulate filler is agglomerated by the adhesion promoter and nanoparticles of the nanoparticulate filler are crosslinked by substitution of radicals on the adhesion promoter by nanoparticles of the nanoparticulate filler.

2. The method as claimed in claim 1, wherein the resin system has a resin basis selected from the group consisting of epoxide-based resins and/or polyurethanes.

3. The method as claimed in claim 2, further comprising using an organosilicon compound as an adhesion promoter for the adhesive.

4. The method as claimed in claim 2, wherein the nanoparticulate filler is selected from the group consisting of metal oxides, metal nitrides, metal sulfides and/or metal carbides.

5. An insulating system comprising:
an insulating tape which is wound around an electrical conductor, the insulating tape comprises a mica tape joined to a carrier material, and the insulating tape is impregnated with a synthetic resin, wherein the impregnated insulating tape is interspersed with nanoparticles of a nanoparticulate filler which are cross-linked at least partly via an adhesion promoter by substitution of radicals on the adhesion promoter by nanoparticles of the nanoparticulate filler and the nanoparticulate filler is agglomerated by the adhesion promoter.

6. The insulating system as claimed in claim 5, wherein the nanoparticles of the nanoparticulate filler are present in a particle size of 2.5 to 70 nm.

7. The insulating system as claimed in claim 5, wherein the nanoparticulate filler is present in the synthetic resin in a concentration of between 5 and 70 wt %.

8. The insulating system as claimed in claim 5, wherein the adhesion promoter is an organic silicon compound.

9. The insulating system as claimed in claim 5, wherein the adhesion promoter is present in a concentration of 0.1 to 45 wt % in the synthetic resin.

10. The method as claimed in claim 1, further comprising using an organosilicon compound as an adhesion promoter for the adhesive.

11. The method of claim 1, further comprising in producing the synthetic resin, mixing resin with an adhesion promoter and afterward incorporating the nanoparticulate filler in the resin.

* * * * *